(12) United States Patent
Claudel et al.

(10) Patent No.: US 9,746,367 B2
(45) Date of Patent: Aug. 29, 2017

(54) SYSTEMS AND METHOD FOR LAGRANGIAN MONITORING OF FLOODING CONDITIONS

(71) Applicant: KING ABDULLAH UNIVERSITY OF SCIENCE AND TECHNOLOGY, Thuwal (SA)

(72) Inventors: Christian Claudel, Thuwal (SA); Atif Shamim, Thuwal (SA); Muhammad Fahad Farooqui, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/891,966

(22) PCT Filed: May 20, 2014

(86) PCT No.: PCT/IB2014/001716
§ 371 (c)(1),
(2) Date: Nov. 17, 2015

(87) PCT Pub. No.: WO2014/188274
PCT Pub. Date: Nov. 27, 2014

(65) Prior Publication Data
US 2016/0097672 A1 Apr. 7, 2016

Related U.S. Application Data

(60) Provisional application No. 61/825,410, filed on May 20, 2013.

(51) Int. Cl.
H04B 1/59 (2006.01)
G01S 5/00 (2006.01)
(Continued)

(52) U.S. Cl.
CPC .............. *G01F 23/64* (2013.01); *G01F 23/76* (2013.01); *G01S 5/0027* (2013.01);
(Continued)

(58) Field of Classification Search
CPC combination set(s) only.
See application file for complete search history.

(56) References Cited

U.S. PATENT DOCUMENTS 3,570,437 A 3/1971 Davis, Jr.
5,283,767 A * 2/1994 McCoy .................. B63B 22/20
114/331

(Continued)

FOREIGN PATENT DOCUMENTS

CA 2131025 9/1993
WO 9821087 5/1998

OTHER PUBLICATIONS

Peter M. Saunders, Experimental Design for Drifting Buoy Lagrangian Test, Sep. 1975, All pages as cited.*

(Continued)

*Primary Examiner* — Brian Zimmerman
*Assistant Examiner* — Cal Eustaquio
(74) *Attorney, Agent, or Firm* — Patent Portfolion Builders PLLC

(57) ABSTRACT

A traffic monitoring system and method for mapping traffic speed and density while preserving privacy. The system can include fixed stations that make up a network and mobile probes that are associated with vehicles. The system and method do not gather, store, or transmit any unique or identifying information, and thereby preserves the privacy of members of traffic. The system and method provide real-time traffic density and speed mapping. The system and method can further be integrated with a complementary flood monitoring system and method.

23 Claims, 7 Drawing Sheets

(51) Int. Cl.
*G01F 23/64* (2006.01)
*G01F 23/76* (2006.01)
*G08B 21/10* (2006.01)
*G01S 5/02* (2010.01)

(52) U.S. Cl.
CPC ............ *G01S 5/0294* (2013.01); *G08B 21/10* (2013.01); *Y02E 10/38* (2013.01)

(56) References Cited

U.S. PATENT DOCUMENTS

| | | |
|---|---|---|
| 5,663,927 A | 9/1997 | Olson |
| 2004/0185727 A1* | 9/2004 | Wada ...................... B63B 22/20 441/6 |
| 2005/0207939 A1 | 9/2005 | Roussi |
| 2005/0258310 A1* | 11/2005 | Bilyk .................... B63B 22/003 244/138 R |
| 2010/0231418 A1* | 9/2010 | Whitlow ................ G01C 23/00 340/945 |
| 2012/0053917 A1* | 3/2012 | McHenry ............ G06F 17/5009 703/9 |

OTHER PUBLICATIONS

PCT/IB2014/001716 International Search Report and Written Opinion Mailed Apr. 28, 2015.

* cited by examiner

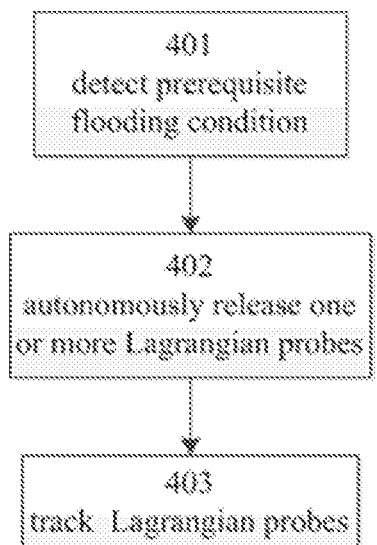
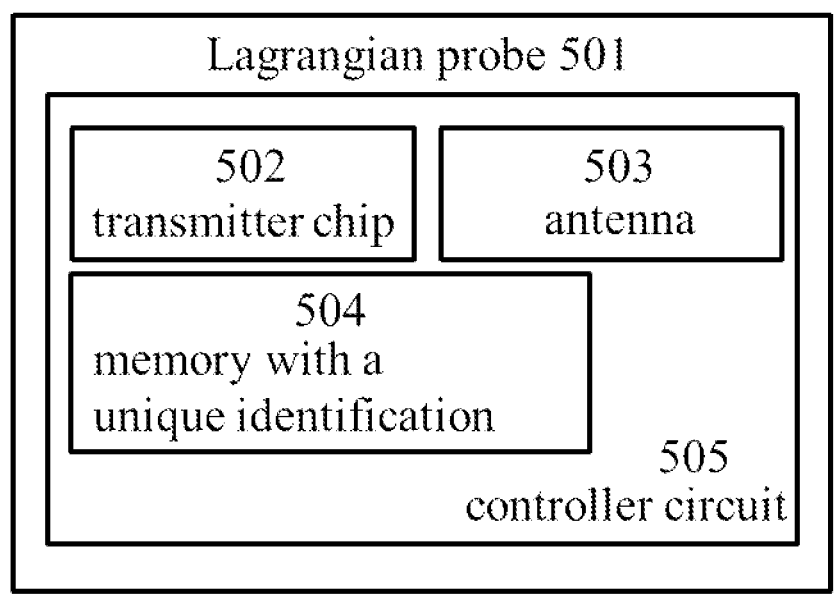

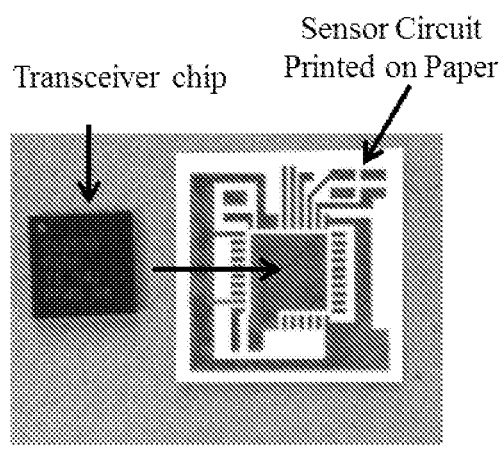
FIG. 10
FIG. 11
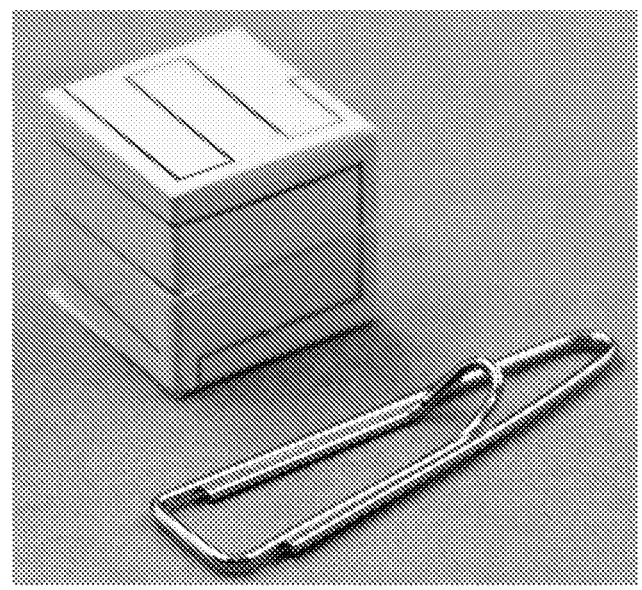

SYSTEMS AND METHOD FOR LAGRANGIAN MONITORING OF FLOODING CONDITIONS

CLAIM OF PRIORITY

This application claims the benefit under 35 USC 371 to International Application No. PCT/IB2014/001716, filed May 20, 2014, which claims priority to U.S. Provisional Application No. 61/825,410, filed on May 20, 2013, each of which is incorporated by reference in its entirety.

TECHNICAL FIELD

The present invention is directed to systems and methods for flood conditions monitoring.

BACKGROUND

Flooding models can be used to predict and manage rapidly changing, emergency situations. Unfortunately, extreme weather conditions often accompany flooding events, making it difficult for traditional aerial and other visual methodologies to be used reliably.

SUMMARY

A system and method for monitoring flooding is provided. A Lagrangian (drift) probe for use within the system is provided.

In one aspect, a Lagrangian probe can include a transmitter chip for generating a signal, an antenna for transmitting the signal, memory with a unique identification, and a controller circuit, integrating the transmitter chip, the antenna, and the memory, for controlling functions of the Lagrangian probe. In certain embodiments, a Lagrangian probe can be powered by a received signal. In some embodiments a Lagrangian probe can include a power store and wherein the transmitter chip can be in a cavity of a multilayer packaging material.

In some embodiments, the Lagrangian probe can be housed in multilayer packaging material. The material can be a liquid crystal polymer or paper coated with glue. The transmitter chip can be a complementary metal oxide semiconductor (CMOS) chip. The liquid crystal polymer can provide a hermetic seal for the Lagrangian probe and/or can provide waterproofing or water resistance. The antenna can be near isotropic antenna. The components of Lagrangian probe can be substantially constructed of organic or biodegradable materials. The Lagrangian probe can be substantially spherical or polyhedral or partially spherical or polyhedral. The Lagrangian probe can incorporate spherical and/or polyhedral components. The Lagrangian probe can be configured to float in water.

In another aspect, a flood sensor network can include a plurality of flood sensors distributed throughout a geographic area and one or more Lagrangian probes. In certain embodiments, the flood sensor network can be configured to autonomously release one or more Lagrangian probes.

In some embodiments, the flood sensors can be configured to detect flooding conditions and autonomously release one or more Lagrangian probes upon detecting a prerequisite flooding condition. In some embodiments, the flood sensors can further detect wireless signals from the Lagrangian probes. The Lagrangian probes can be implemented in a system-on-package platform. The system-on-package platform can include a transmitter chip for generating a signal, an antenna for transmitting the signal, memory with a unique identification, and a controller circuit, integrating the transmitter chip, the antenna, and the memory, for controlling functions of the Lagrangian probe.

In some embodiments, the flood sensors can track Lagrangian probes based on detected wireless signals. Tracking Lagrangian probes can be based on trilateration, measurement of received signal strength, and/or onboard tracking systems. In some embodiments, unmanned air vehicles, or UAVs, can be utilized. A UAV can include components for tracking Lagrangian probes and/or for communicating with one or more stations and/or other unmanned air vehicles. A UAV can store Lagrangian probes for deployment.

In another aspect, a method of monitoring flooding can include detecting flooding conditions with a sensor network, autonomously releasing one or more Lagrangian probes upon detecting a prerequisite flooding condition, and measuring flooding conditions based on tracking Lagrangian probes. In some embodiments, tracking Lagrangian probes can be accomplished by trilateration by the sensor network. Tracking Lagrangian probes can accomplished by measuring received signal strengths from the one or more Lagrangian probes. Lagrangian probes can include onboard tracking devices and tracking data can be transmitted from Lagrangian probes to the sensor network. Tracking Lagrangian probes can be accomplished by a combination of trilateration, measuring received signal strengths, and receiving tracking data from systems on board Lagrangian probes. The sensor network can be configured to model the evolution of flooding conditions. The sensor network can be an existing fixed network and the tracking of Lagrangian probes can augment other flood monitoring functions of the fixed network. Lagrangian probes can be released from one or more fixed sensor stations and/or from one or more UAVs. The UAVs can track Lagrangian probes and/or communicate with base stations. The base stations can be ground based stations or they may be mobile stations, for example disposed in wheeled vehicles or airplanes.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 4 illustrates an exemplary representation of a method for monitoring flooding.

FIG. 5 illustrates a representation of a Lagrangian probe.

FIG. 10 is a picture of components of the interior of a probe.

FIG. 11 is a picture of an exemplary fabricated probe.

DETAILED DESCRIPTION

Figure 1:
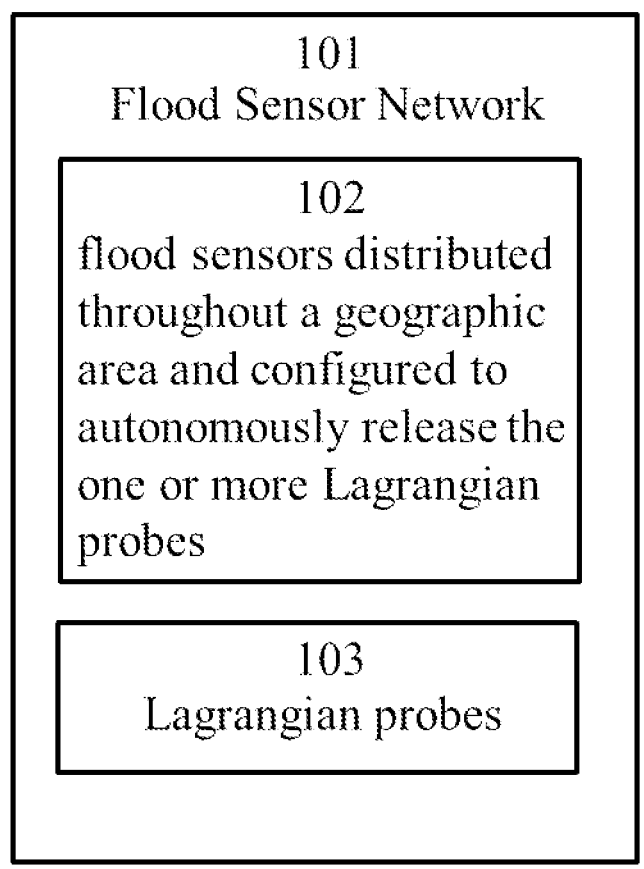
FIG. 1 illustrates an exemplary representation of a flood monitoring system.

A detailed explanation of the system and method according to the preferred embodiments are described below.

Embodiments of the systems and methods may be embodied as, among other things: a method, an apparatus, a system, or computer-program products. Accordingly, the embodiments may take the form of a hardware embodiment, a software embodiment, or an embodiment combining software and hardware. For example, in part, the systems and methods can take the form of a computer-program product that includes computer-useable instructions embodied on one or more computer-readable media. Some terms, such as transducer and transceiver, or transmitter, sensor, and probe can have overlapping meanings and describe overlapping or equivalent technologies or products, and therefore, may be used interchangeably. Such terms are intended to invoke their specific meaning and their general meaning, as well as any overlapping or equivalent meanings, technologies or products.

Some terms, such as probe, sensor, and microsensor, or transceiver, transponder, receiver, and transmitter, can have overlapping meanings and describe overlapping or equivalent technologies or products, and therefore, may be used interchangeably. Such terms are intended to invoke their specific meaning and their general meaning, as well as any overlapping or equivalent meanings, technologies or products.

Flooding models can be described in terms of flux in time across fixed points, the Eulerian frame of reference, or in terms of individual fluid parcels as they move in time, the Lagrangian frame of reference. Models of real-world flooding are currently not accurate since they depend upon a large number of parameters which are poorly known. For example, classical flood models such as the Saint-Venant equations require two types of information: the water level (height) and the water velocity (speed and direction). If one is to model accurately the evolution of a flood, one needs to obtain parameters such as these more accurately, in real time if possible.

Measuring the level of flood water is relatively easy using remote level sensors (such as acoustic rangefinders). Measuring velocity of a flood water stream is a much more complex and expensive task because flood water is typically very dirty, containing significant debris. Mechanical or pressure-based flow sensors have to be in the water stream to function and are particularly prone to clogging. Acoustic flow sensors also have to be the water stream to function and must be protected against impact of debris, which increases costs. Laser-based flow sensors are very expensive and power consuming, which increases the total cost of the sensing infrastructure. Laser-based systems also pose safety hazards.

Lagrangian (drifting) sensors have been used for water channel monitoring and oceanic currents monitoring. Tinka et al. teach monitoring a water channel using passive and active drifters. "Quadratic Programming based data assimilation with passive drifting sensors for shallow water flows," Tinka et al., IEEE Conference on Decision & Control (2009). Each drift sensor is encapsulated in an 11 cm-long fiberglass pipe which contains, inter alia, a GPS receiver and a cellular phone. The drift sensor is connected by a 1.3 m aluminum tube to a drogue, which is made of two polycarbonate plates, 40 cm square, mounted diagonally and designed to limit the effects of surface currents. Tossavainen et al. teach an estimation method for measuring Lagrangian drifter positions in two-dimensional (shallow) water to compensate for the lack of knowledge of upstream and downstream boundary conditions in rivers. "Ensemble Kalman Filter based state estimation in 2D shallow water equations using Lagrangian sensing and state augmentation," O. P Tossavainen et al., IEEE conference on Decision and Control (2008). The drift sensors are equipped with GPS receivers and report their positions, providing additional information of the state of the river. The general concept of using a large number of microsensors to monitor a system has been described in the "SmartDust project." "Next century challenges: mobile networking for 'Smart Dust,'" Kahn et al., Proceedings of Mobicom 99. In the SmartDust project, sensors were dropped by a UAV across a roadway to monitor for disturbances for military vehicle detection on a battlefield (details are available from http://robotics.eecs.berkeley.edu/~pister/29Palms0103/).

Unmanned air vehicles (UAVs) are also used for flood monitoring. They typically rely on cameras, making them unsuitable for monitoring during low-light conditions, such as at night or during rain storms or other bad weather conditions. Unfortunately, extreme weather conditions often accompany flooding events.

The present system provides improvements over several aspects of flood monitoring in the prior art. Manual release of sensors is very inefficient, as sensors may not be released where needed. Manual release of sensors also requires manpower and central coordination, which is an additional burden during floods. The present system can be very inexpensive and can be placed at key locations of an existing or new fixed network of sensors well in advance of flooding. The system can then lie dormant in wait for future flooding conditions. In addition to monitoring from a fixed or ground-based monitoring network, the can augment flood monitoring capabilities of camera-equipped UAVs. This system would be a very inexpensive upgrade for UAV monitoring systems as the cost of each transmitter is low. Because of its low cost, the system can be deployed on very wide areas, for example desert areas around large cities. Finally, since it can be UAV-based, it can be deployed in different areas quickly and easily. For example a set several UAVs equipped with this system is small and lightweight enough to be carried as cargo to other locations on demand.

The Lagrangian sensor system can augment existing fixed flood sensor networks, rather than being deployed in a standalone system. Another advantage of the Lagrangian sensor system lies in the fact that the existing fixed flood sensor network itself can automatically release the probes whenever they are needed.

An exemplary embodiment of a flood monitoring system is represented in FIG. 1. The flood monitoring system can include a sensor network (101). The sensor network can include flood sensors (102) distributed throughout a geographic area. The sensors can be configured to store and to autonomously release buoyant disposable Lagrangian probes (103). The flood sensors can be fixed stations. The Lagrangian probes can be stored and released by the fixed flood sensors whenever they are needed. The flood sensor network can also incorporate mobile sensor stations, deployable on demand. The cost of the system can be reduced by integrating the system with existing structures, such as a flood monitoring network or a traffic monitoring network. Fixed stations can be installed on telephone poles, traffic light signals, or other existing structures.

Lagrangian probes can be utilized, for example, to improve the accuracy of a real-time flood estimation process ("nowcast"). The probes can also be utilized in an inverse modeling process or a forecast process. An exemplary embodiment of a method of monitoring flooding is shown in FIG. 4. The method can include detecting flooding conditions (401) with a sensor network, autonomously releasing (402) one or more Lagrangian probes (403) upon detecting a prerequisite flooding condition. The method can measure flooding conditions based on tracking the one or more Lagrangian probes. Tracking the one or more Lagrangian probes can be accomplished by trilateration by the sensor network or by measuring received signal strengths from the one or more Lagrangian probes. Lagrangian probes can also or alternatively include onboard tracking devices for transmitting tracking data to the sensor network. The sensor network can model the evolution of the flooding conditions. The sensor network can augment data measured from an existing fixed network. Lagrangian probes can be released from one or more fixed sensor stations and/or from one or more unmanned air vehicles. Unmanned air vehicles (UAVs) can track Lagrangian probes and communicate with one or more base stations. Embodiments of the invention can include disposable probes which can be released and used in a flood sensor network to track the evolution of a flood. The probes can be released by a storage unit when and where they are needed to improve the accuracy of the real-time flood estimation process, e.g. nowcast, the inverse modeling process, or the forecast process. The probes may be stored in and released from the network of sensors, or may be contained in a separate storage unit. The motion of these probes is then tracked by the existing flood sensor network, and the resulting data is combined with the data generated by the fixed flood sensor network.

The flood sensor network itself can be configured to automatically release the probes upon flooding. The motion of these transmitters can be tracked by the fixed network, and the resulting data can be combined with the data generated by the fixed sensor stations. The motion of these transmitters can then be tracked by the existing flood sensor network, and the resulting data can be combined with data generated by the flood sensor network. The flood sensor network can measure probe positions and velocities by trilateration and/or the received signal strength. Probe positions can be additionally, or alternatively, measured by the probe itself with a tracking device coupled to the transmitter. Positional data can then be transmitted to the network. The data generated by the system can include the position, path and/or speed of the probes. Any or all of these data types can then be used to improve the accuracy of the monitoring and analysis, including nowcast, inverse modeling and forecast processes.

Figure 2:
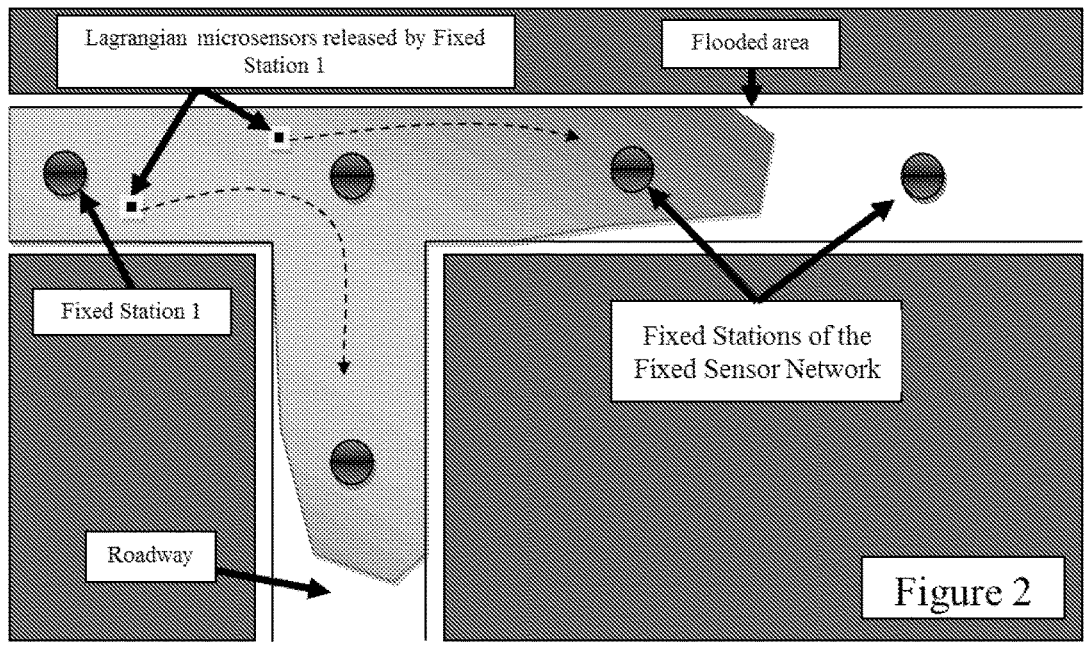
FIG. 2 is an exemplary representation of a fixed network system for flood monitoring.

An exemplary embodiment of a system is shown in action in FIG. 2. The system can include fixed stations distributed along roadways. The fixed stations can continuously or periodically monitor conditions for flooding. As flooding begins, the fixed stations can determine if a specific condition has been met, for example a water level of a given height. Once the condition has been met, the system can autonomously release Lagrangian probes. The system can then track the probes to measure the evolution of a flood. A flooding event is shown in FIG. 2. Flood water is shown flowing from the top left. When the water level at Fixed Station 1 reaches a predetermined height (or an alternative criterion is met), Fixed Station 1 automatically releases a plurality of Lagrangian probes into the flow of flood water. The probes, or microsensors, float with the flow of water and are tracked by the Fixed Stations. Based on the tracking data, the flood sensor network can model the evolution of the flood or augment other detected flood data.

Figure 3:
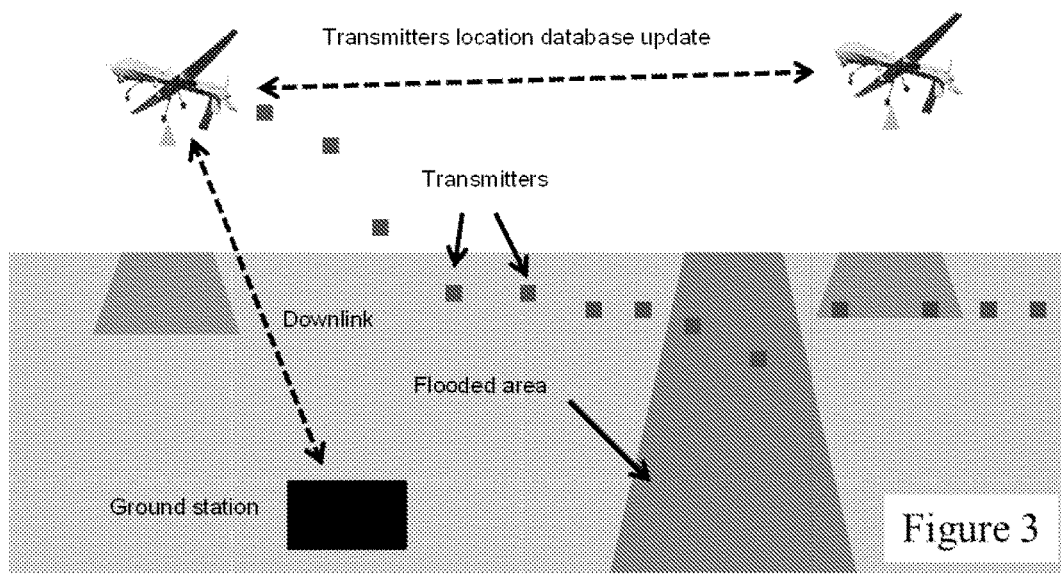
FIG. 3 is an exemplary representation of a flood monitoring system incorporating unmanned air vehicles.

An exemplary embodiment of a system is shown in FIG. 3. The flood monitoring system, upon detection of a preselected criterion, for example inclement weather, autonomously activates one or more UAVs carrying disposable active, semi-active, and/or passive Lagrangian probes for detecting floods conditions. The probes can be dropped by the UAVs across areas to be monitored. The UAVs can be equipped with directional or omni-directional antennae that can communicate with and/or receive signals from the Lagrangian probes. The UAVs can then transmit data to one or more base stations, which can map the locations of the transmitters. Each of the one or more UAVs can be configured to map the Lagrangian probes and transmit the map data to a base station. Multiple UAVs can be used in conjunction to map an area faster. The Lagrangian probes can be waterproof and buoyant, and once dropped, can remain at fixed positions unless dragged away by water streams or surface winds. To minimize the effect of surface winds, the probes can be configured to have a high terminal velocity in air. The transmitters location map (obtained from the UAVs) can be used by base stations in conjunction with flood models to estimate and/or forecast areas with flooding. The resulting flood nowcast and/or forecast maps can then be used by government agencies for emergency response.

An important feature of some embodiments is that the UAVs can be autonomous mechatronic devices. Upon the sensor system detecting a preselected flooding condition, one or more UAVs can be activated and directed to the general location of triggering fixed sensor stations. The UAVs can deploy Lagrangian probes stored onboard. The fixed sensor stations and/or the UAVs can then track the probes in order to map the evolution of the flood. It should also be noted that the base stations with which the UAVs communicate can be fixed ground stations, mobile stations. The mobile stations can be housed within a land-based vehicle, a handheld device, and/or an airplane.

Turning now to the probe devices, Lagrangian probes are advantageously inexpensive devices, requiring little or no maintenance and no special protection. Their low mass can make them very resilient to impacts, and they can be easily waterproofed. While these sensors are disposable (in contrast to the other types of water flow sensors), their relatively low cost and the relatively low occurrence of floods make them useful for sensing water velocity during floods.

Lagrangian probes and Lagrangian sensors or microsensors can take many forms consistent with the several embodiments. Lagrangian probes in this case refer to sensors and/or devices that transmit signals without sensing. Lagrangian probes can be implemented in system-on-package (SoP) platforms. An SoP can contain a custom transmitter chip, an efficient antenna, a memory with a unique identification (ID), a controller circuit and a power source, for example a miniaturized battery. The transmitter chip can be realized through low-cost complementary metal oxide semiconductor (CMOS) processes. The transmitter circuits can be low-powered as well as flexible enough to communicate data to the fixed sensors through, for example, modulation techniques.

Figure 6:
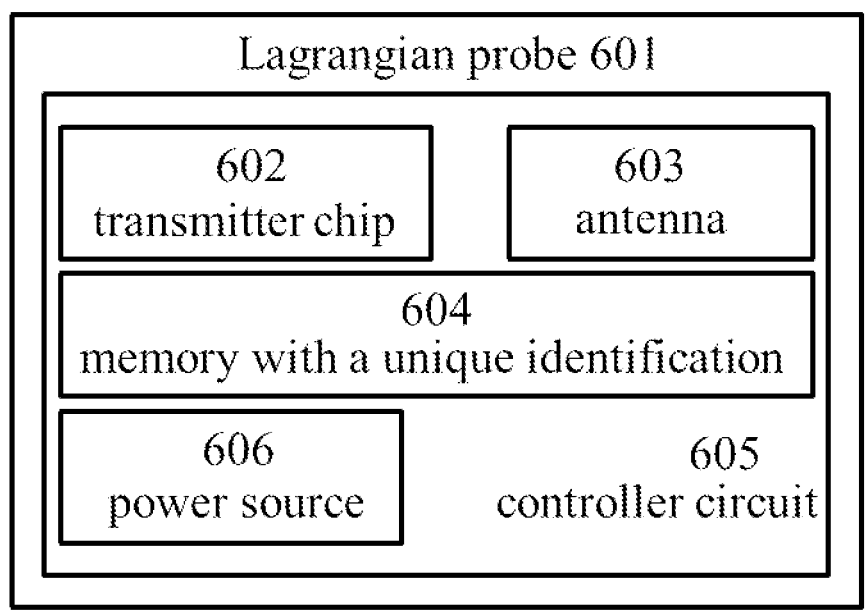
FIG. 6 illustrates a representation of a Lagrangian probe.

Referring to FIG. 5, a Lagrangian probe (501) can include a transmitter chip (502) for generating a signal, an antenna (503) for transmitting the signal, memory (504) with a unique identification, and a controller circuit (505) which integrates the transmitter chip, the antenna, and the memory, and controls various functions of the Lagrangian probe. The transmitter chip, the antenna, and the controller chip can be configured such that the probe acts as a transmitter, as a transceiver, and/or as a transponder. A Lagrangian probe can be a radio-frequency identification (RFID) wireless non-contact system. In such embodiments, the probe can be passive, active, or battery-assisted-passive. As a passive RFID probe, the Lagrangian probe can be powered by the energy in signals from the sensor network and operate as a transponder. As shown in FIG. 6, a Lagrangian probe can include a power store (606) for active or battery-assisted passive embodiments. In such embodiments, the Lagrangian probe can act as a transmitter, as a transceiver, and/or as a transponder. The power store can be a battery, which can in turn be a miniaturized battery to improve buoyancy of the probe in water.

Components of the Lagrangian probe can be in a cavity of a multilayer packaging material. For example, the transmitter chip, the memory, the controller circuit, and/or the antenna can be inside a multilayer packaging material. Multilayer packaging material can be liquid crystal polymer (LCP), paper coated with glue, or a combination thereof. Paper is advantageous because it is extremely cheap and disposable. To facilitate buoyancy of the probe, the components can be printed directly onto the packaging material, for example, the antenna can be conductive ink. Liquid crystal polymer is advantageous because it can provide a hermetic seal for the Lagrangian probe to protect it from water and/or other hostile environments. The material can alternatively be cellulose-based or other organic materials. The probe can be made of environmentally friendly materials that biodegrade to facilitate the disposable nature of the probes. The transmitter chip can be a complementary metal oxide semiconductor (CMOS) chip. The antenna can be a high efficiency, near isotropic antenna. A Lagrangian probe can be flat, substantially two-dimensional. Alternatively, a Lagrangian probe can be spherical and/or polyhedral, or it can have a combination of flat, spherical, and/or polyhedral components. In some embodiments, the probe can be a cube. In some embodiments, the probe can be a tetrahedron. A probe can be a sphere or partially spherical. The Lagrangian probe can be configured to float in water and/or substantially on top of water. A Lagrangian probe can be configured to float near a desired depth. A small battery can be encapsulated in the LCP package as well. The SoP can be small, thin and lightweight to ease its floating operation in floodwater.

An alternative embodiment can be accomplished by installing the monitoring system within an existing monitoring system. The existing system can have sensor boards, which can be connected to ultrasonic transducers pointing towards the ground or at roads to be monitored. Each sensor board can process measurement data with its neighbors to estimate local traffic and/or flooding conditions. Local traffic conditions measured or analyzed can be local density, flow and/or velocity conditions across a roadway. Local flood conditions measured or analyzed can be the estimated height of water over the ground and/or water flow speed and/or flow direction. The fixed network can be configured to detect and analyze either or both traffic and flooding.

The traffic monitoring system and/or flood monitoring system can include an ultrasound sensor with a wireless communication device and an ultrasound transducer. The ultrasound transducer can be configured to monitor traffic and/or roadway water conditions. A central computer can be configured to receive roadway and/or flooding conditions from the ultrasound sensor. The system may further have a plurality of ultrasound sensors configured to communicate with neighboring ultrasound sensors. The monitoring system can also have a central processing unit (CPU) configured to determine traffic and/or flooding conditions of a roadway at the ultrasound sensor. Each ultrasound sensor can have a CPU. The central computer can be configured to determine the roadway conditions at each of the plurality of ultrasound sensors from the received roadway condition information. The central computer may also be configured to map roadway conditions at each of the plurality of ultrasound sensors from the received roadway condition information. Determined roadway conditions can indicate if a road is passable, and can further indicate what type of vehicles can pass. The central computer can be configured to further provide routing information in order to avoid impassable roads. The central computer can also receive position information related to the location of Lagrangian probes. The received probe information can be used to track flood conditions with more certainty.

A server system can process data corresponding to local traffic and/or local flooding conditions, which can be relayed by sensor nodes. Global traffic conditions can then be estimated using traffic flow models and/or origin-destination models. Maps of current and future flooding conditions can be created by the system. In an embodiment containing sensors for flood monitoring, global flooding conditions can be provided using data generated by the ultrasonic transducers. Global flooding conditions can also be forecasted using, inter alia, current conditions, meteorological data and/or sewer models, in addition to data gained from the Lagrangian probes.

Additionally, the system can monitor and/or forecast the height of water on roads during floods, enabling local authorities to assess which roads are impassable (for general vehicles) and which roads are fordable by relief vehicles or other high-clearance vehicles. Based on the monitored data, the system can generate of a map of usable roads (and accessible areas) for emergency services in real time, which is critical information during floods (in particular flash flood events). The probes can generate path and speed data. Both types of data can improve the accuracy nowcasts, inverse modeling, or forecast processes. The fixed flood sensor network can generate at least two types of data: water level data, from direct water level measurement at the nodes, and water velocity data, by tracking the location of probes that are released by some element of the network.

Figure 7:
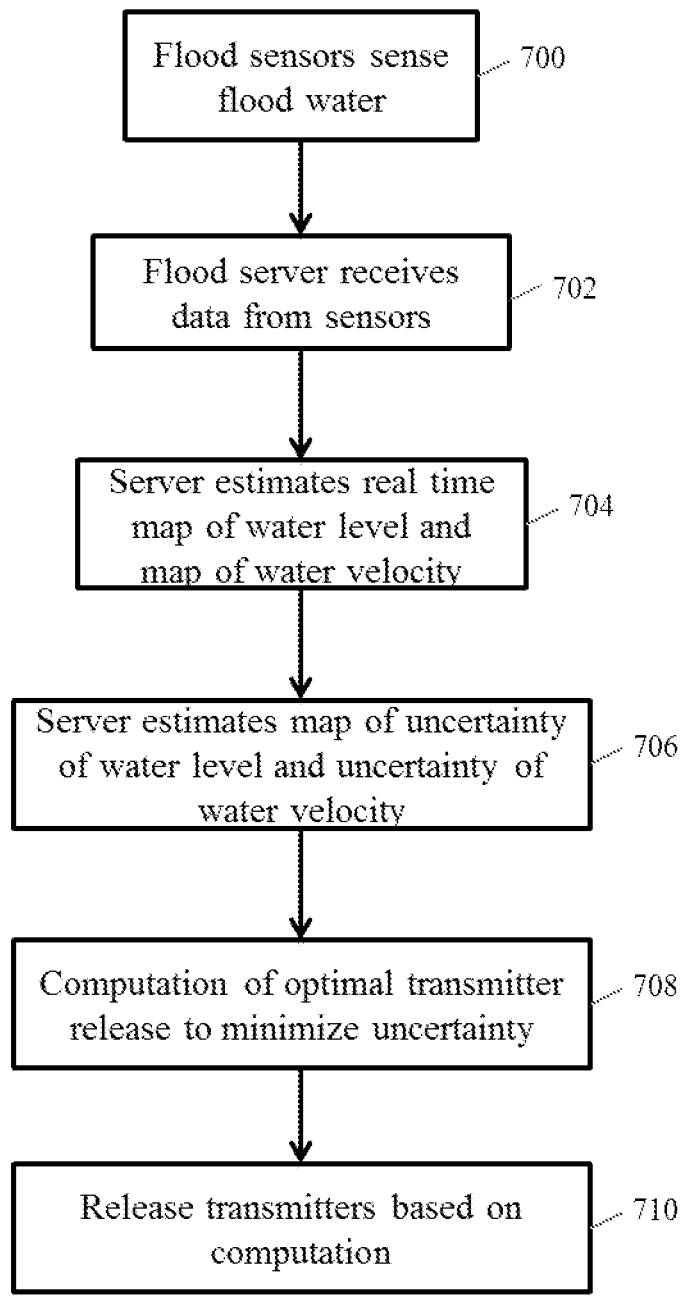
FIG. 7 is a flow chart of the decision to release a probe.

FIG. 7 is a flow chart of an example of Lagrangian probe use. Initially (i.e. before a flood arises), the data can consist of water level data, which can be forwarded to a gateway that transfers this data to a computer server. In the event of a flood (700) the water level data generated by each of the sensor nodes can be forwarded to a flood estimation server (702) which can compute, using estimation methods such as ensemble Kalman Filtering and/or Particle filtering, four maps: a map of water velocity estimate (nowcast) (704); a map of water velocity uncertainty estimate (706); a map of water level estimate (nowcast) (704); and a map of water level uncertainty estimate (706).

Velocity data from the probes is not required to compute these four maps, but additional velocity data can reduce uncertainties. Based on the maps of water level uncertainty and water velocity uncertainty, the server can compute control orders to be sent back to nodes of the sensor network (708). The control scheme can minimize the uncertainties, such as uncertainties calculated by a least square equation, by signaling the sensor nodes to release Lagrangian probes. These commands can be transmitted back to the gateway and to the network, forwarding each command to the corresponding node which then releases a probe (810). For example, the server can compute that the release of one or more probes by three specific sensors would help to minimize the uncertainty in the mapping algorithm. In this way the probes may be selectively dropped when more information is needed in order to improve accuracy of nowcasts and forecasts.

Figure 8:
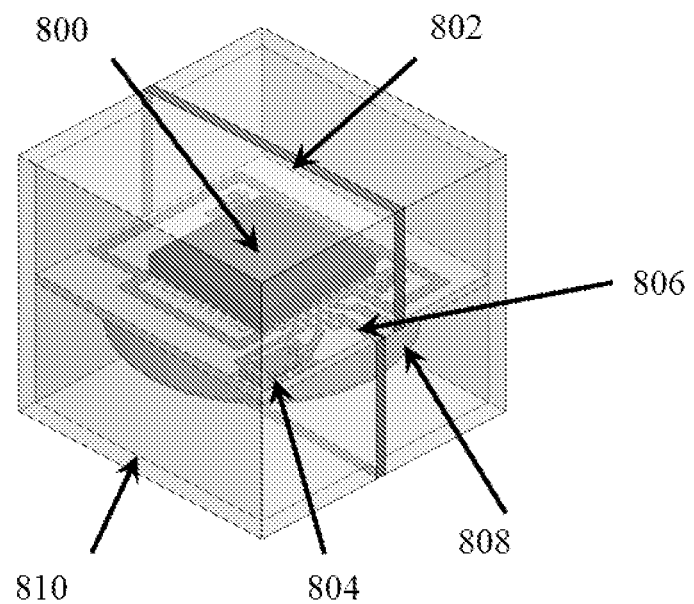
FIG. 8 is a schematic of an embodiment of a Lagrangian probe.

In some embodiments, the probes can be implemented in a system-on-package (SoP) platform such as that shown in FIG. 8. The SoP can include a transmitter (800), an antenna (802), a memory with a unique identification (ID) (804), and a controller circuit (806). A battery (808) may also be included, but an onboard power store is not necessarily required in all embodiments because the probe can be configured such as to be powered by incident signals as is known if the RFID arts. The necessity and type of the battery and antenna will depend on the type of transmitter or sensor used. The memory (804) and the controller circuit (806) may be inside the transceiver chip (800). Embodiments of the transmitter can be realized in a standard low cost CMOS process or the transmitter can be a RFID. The RFID may be active, semi-passive, or passive depending on the range needed for the transmitter. The RFID may be printed on paper with conductive ink, thereby decreasing the weight and environmental impact of the transmitter. Other elements of the SoP may also be printed on paper with conductive ink, such as the controller circuit. In order to decrease the weight of the package, the transmitter circuits may be low power but are flexible enough to communicate data to the fixed flood sensor transceiver through modern modulation schemes. The transmitter may also include a transceiver. The probes can include a sensor apparatus, such as a GPS or other wireless positioning system. The transmitter can be placed in a cavity in a packaging material (810) such as LCP or paper. Paper is extremely cheap, organic, light and flexible. The advantage of LCP is multifold: it can provide hermetic sealing to the transmitter floating in water, as can paper coated with glue; an efficient and near isotropic antenna can be realized in the LCP or paper package; and LCP is organic, environmental friendly, and well adapted for disposable solutions, as is paper coated with glue. A small battery may be encapsulated in the LCP package as well. The SoP may be of any shape, such as spherical or polyhedral. The antenna can be incorporated into each side of the shape to enable at least a part of the antenna to be above water. In the case of a cube shape, the probe is equally probable to float in any direction. In some embodiments, the SoP can be small, thin, square shaped and lightweight to increase buoyancy in floodwater. In some embodiments of the invention, the transmitter can be designed to be cheap to produce, small, and environmentally friendly. Each dimension of the probe may be less than 100 mm, less than 75 mm, less than 50 mm, less than 40 mm, less than 30 mm, less than 25 mm, less than 20 mm, less than 19 mm, less than 18 mm, less than 17 mm, less than 16, mm, less than 15 mm, less than 14 mm, less than 13 mm, less than 12 mm, less than 11 mm, less than 10 mm, less than 9 mm, less than 8 mm, less than 7 mm, less than 6 mm, or less than 5 mm. In a specific embodiment of the invention, the probe is about 13 mm×13 mm×13 mm, as shown in FIG. 11.

The memory on the probe can have an ID unique to other deployed probes. In this way the probe can be uniquely identified and tracked by the sensors system. If needed, the probe can be activated (turned on) as it is released from a storage unit, or the probe may be activated by water. The probe then may transmit the unique ID at a set time frame, such as 5 times a minute, 10 times a minute, 20 times a minute, 30 times a minute, 40 times a minute, 50 times a minute, 60 times a minute, or faster. A networked sensor can transmit radio waves to power and read the RFID.

Figure 9:
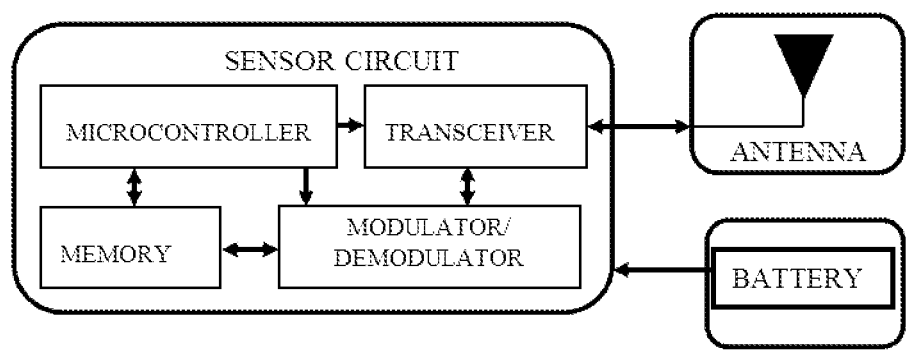
FIG. 9 is a schematic of an embodiment of a Lagrangian probe.

In some embodiments, shown for example in FIGS. 9 and 10, the interior of the sensor and the substrate of the circuit can be made from paper. Embodiments consistent with the schematic of FIG. 9 can include a microcontroller, a transceiver, a memory and a modulator/demodulator. The sensor circuit can be connected to both an antenna and a battery. The circuit and the sensor can be printed on the paper using silver nanoparticle based ink jet printing, for example. The battery can be a coin type and made of lithium, it can be an Edison-type, it can be a capacitor-type element, or it can be another type of battery. The transceiver can be a silicon chip enclosed in a plastic package. The operating frequency of the sensor in this example is around 2.4 GHz with a bandwidth of about 100 MHz. Quadrature Phase Shift Keying (O-QPSK) is used to modulate the carrier. The sensor uses Direct Sequence Spread Spectrum (DSSS) technique for multichannel operation. The sensor circuit consist a microcontroller, a memory to store the RFID or other sensor data, a modulator/demodulator and RF transceiver chain. All of these components are on a single chip. Water proofing is achieved by coating the sensor with glue which provides sufficient sealing for several hours of operation in water. FIG. 10 shows a picture of a transceiver chip and a sensor circuit printed on paper. FIG. 11 is a picture of a microprocessor of about 13 mm×13 mm×13. As shown in FIG. 11 the antenna extends to each surface of the probe. The antenna is a dipole with length of about 1.5 times the wavelength at operating frequency. The arms of the antenna are meandered and extended on each face of the probe, as shown in FIG. 11, to make it a compact 3D cube antenna having a near isotropic radiation pattern.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

The various techniques, methods, and systems described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those described elsewhere in this document. Various computer-based systems, methods and implementations in accordance with the above-described technology are presented below.

In one implementation, a general-purpose computer can have an internal or external memory for storing data and programs such as an operating system (e.g., DOS, Windows 2000™, Windows XP™, Windows NT™, OS/2, iOS, UNIX or Linux) and one or more application programs. Examples of application programs include computer programs implementing the techniques described herein, authoring applications (e.g., word processing programs, database programs, spreadsheet programs, simulation programs, engineering programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer or Google Chrome) capable of rendering standard Internet content and other content formatted according to standard protocols such as the Hypertext Transfer Protocol (HTTP), HTTP Secure, or Secure Hypertext Transfer Protocol.

One or more of the application programs can be installed on the internal or external storage of the general-purpose computer. Alternatively, in another implementation, application programs can be externally stored in or performed by one or more device(s) external to the general-purpose computer.

The general-purpose computer includes a central processing unit (CPU) for executing instructions in response to commands, and a communication device for sending and receiving data. One example of the communication device is a modem. Other examples include a transceiver, a communication card, a satellite dish, an antenna, a network adapter, network interface card, mobile internet device, or some other mechanism capable of transmitting and receiving data over a communications link through a wired or wireless data pathway.

The general-purpose computer can include an input/output interface that enables wired or wireless connection to various peripheral devices. Examples of peripheral devices include, but are not limited to, a mouse, a mobile phone, a personal digital assistant (PDA), a smartphone, a tablet computer, a keyboard, a display monitor with or without a touch screen input, and an audiovisual input device. In another implementation, the peripheral devices can themselves include the functionality of the general-purpose computer. For example, the mobile phone or the PDA can include computing and networking capabilities and function as a general purpose computer by accessing the delivery network and communicating with other computer systems. Examples of a delivery network include the Internet, the World Wide Web, WANs, LANs, analog or digital wired and wireless telephone networks (e.g., Public Switched Telephone Network (PSTN), Integrated Services Digital Network (ISDN), or Digital Subscriber Line (xDSL)), radio, television, cable, or satellite systems, and other delivery mechanisms for carrying data. A communications link can include communication pathways that enable communications through one or more delivery networks.

In one implementation, a processor-based system (e.g., a general-purpose computer) can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, solid state drive, or flash memory devices including memory cards, USB flash drives, solid-state drives, etc. The removable storage drive reads from or writes to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as can be found in video game devices), a removable memory chip (such as an EPROM or PROM) and associated socket, and other removable storage units and interfaces, which allow software and data to be transferred from the removable storage unit to the computer system.

In one embodiment, the computer system can also include a communications interface that allows software and data to be transferred between the computer system and external devices. Examples of communications interfaces can include a modem, a network interface (such as, for example, an Ethernet card), a communications port, and a PCMCIA slot and card. Software and data transferred via a communications interface are in the form of signals, which can be electronic, electromagnetic, optical or other signals capable of being received by a communications interface. These signals are provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer usable medium" are generally used to refer to media such as a removable storage device, a disk capable of installation in a disk drive, and signals on a channel. These computer program products provide software or program instructions to a computer system.

Computer programs (also called computer control logic) are stored in main memory or secondary memory. Computer programs can also be received via a communications interface. Such computer programs, when executed, enable the computer system to perform the features as discussed herein. In particular, the computer programs, when executed, enable the processor to perform the described techniques. Accordingly, such computer programs represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, causes the processor to perform the functions of the techniques described herein.

In another embodiment, the elements are implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements are implanted using a combination of both hardware and software.

In another embodiment, the computer-based methods can be accessed or implemented over the World Wide Web by providing access via a Web Page to the methods described herein. Accordingly, the Web Page is identified by a Universal Resource Locator (URL). The URL denotes both the server and the particular file or page on the server. In this embodiment, it is envisioned that a client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol or HTTP). The selected page is then displayed to the user on the client's display screen. The client can then cause the server containing a computer program to launch an application to, for example, perform an analysis according to the described techniques. In another implementation, the server can download an application to be run on the client to perform an analysis according to the described techniques.

Other embodiments are within the scope of the following claims.

The invention claimed is:

1. A Lagrangian probe, comprising:
a transmitter chip for generating a signal;
an antenna for transmitting the signal;
memory with a unique identification; and
a controller circuit, integrating the transmitter chip, the antenna, and the memory, for controlling functions of the Lagrangian probe,
wherein the Lagrangian probe is configured to float in flooding waters above a roadway to monitor flooding conditions on the roadway, and
wherein the Lagrangian probe is prepositioned proximate to a flood location at a flood sensor proximate to the location of the roadway; and
wherein the flood sensor is configured to autonomously release the Lagrangian probe when a prerequisite flooding condition is detected by the flood sensor at the flood location.

2. The Lagrangian probe of claim 1, further comprising a power store, wherein the transmitter chip is in a cavity of a multilayer packaging material.

3. The Lagrangian probe of claim 2, wherein the multilayer packaging material is a liquid crystal polymer.

4. The Lagrangian probe of claim 3, wherein the power store is a battery, wherein the transmitter chip is a complementary metal oxide semiconductor (CMOS) chip, and wherein the liquid crystal polymer provides a hermetic seal for the Lagrangian probe.

5. The Lagrangian probe of claim 1, wherein the antenna is a near isotropic antenna.

6. The Lagrangian probe of claim 1, wherein the Lagrangian probe is substantially constructed of organic or biodegradable materials.

7. The Lagrangian probe of claim 1, wherein the Lagrangian probe is substantially spherical or polyhedral.

8. The Lagrangian probe of claim 1, wherein the Lagrangian probe is configured to float in water.

9. A flood sensor network, comprising:
a plurality of flood sensors distributed throughout a geographic area;
one or more Lagrangian probes stored at the plurality of flood sensors;
wherein the flood sensors are configured to autonomously release the one or more Lagrangian probes when a prerequisite flooding condition is detected, and
wherein the one or more Lagrangian probes are prepositioned proximate to the plurality of flood sensors.

10. The flood sensor network of claim 9, wherein the flood sensors are configured to detect flooding conditions and the autonomous release of the one or more Lagrangian probes occurs upon detecting the prerequisite flooding condition.

11. The flood sensor network of claim 10, wherein the flood sensors further detect wireless signals from the Lagrangian probes.

12. The flood sensor network of claim 11, wherein the one or more Lagrangian probes are implemented in a system-on-package platform, comprising:
a transmitter chip for generating a signal;
an antenna for transmitting the signal;
memory with a unique identification; and
a controller circuit, integrating the transmitter chip, the antenna, and the memory, for controlling functions of the Lagrangian probe,
wherein the Lagrangian probe is configured to float in flooding waters above a roadway to monitor flooding conditions on the roadway.

13. The flood sensor network of claim 11, wherein the flood sensors track the one or more Lagrangian probes based on the detected wireless signals.

14. The flood sensor network of claim 12, wherein tracking the one or more Lagrangian probes is based on one or more of trilateration, measurement of received signal strength, and onboard tracking systems.

15. The flood sensor network of claim 9, further comprising unmanned air vehicles, wherein the unmanned air vehicles comprise components for tracking the one or more Lagrangian probes and for communicating with one or more stations and/or other unmanned air vehicles.

16. A method of monitoring flooding, comprising:
detecting flooding conditions with a sensor network that stores Lagrangian probes at flood sensors;
autonomously releasing one or more of the Lagrangian probes from the flood sensors upon detecting a prerequisite flooding condition;
measuring flooding conditions based on tracking the one or more Lagrangian probes, and prepositioning the one or more Lagrangian probes proximate to the flood sensors.

17. The method of monitoring flooding of claim 16, wherein tracking the one or more Lagrangian probes is accomplished by trilateration by the sensor network.

18. The method of monitoring flooding of claim 16, wherein tracking the one or more Lagrangian probes is accomplished by measuring received signal strengths from the one or more Lagrangian probes.

19. The method of monitoring flooding of claim 16, wherein the one or more Lagrangian probes comprise onboard tracking devices and tracking data is transmitted from the one or more Lagrangian probes to the sensor network.

20. The method of monitoring flooding of claim 16, wherein the sensor network models the evolution of the flooding conditions.

21. The method of monitoring flooding of claim 16, wherein the sensor network is an existing fixed network and wherein tracking the one or more Lagrangian probes augments other flood monitoring functions of the fixed network.

22. The method of monitoring flooding of claim 16, wherein the one or more Lagrangian probes are released from one or more fixed sensor stations and/or from one or more unmanned air vehicles.

23. The method of monitoring flooding of claim 22, wherein the one or more unmanned air vehicles tracks the one or more Lagrangian probes and communicates with one or more base stations.

* * * * *